United States Patent [19]

Dixon et al.

[11] Patent Number: 4,900,917

[45] Date of Patent: Feb. 13, 1990

[54] POLARIZATION INSENSITIVE OPTICAL COMMUNICATION DEVICE UTILIZING OPTICAL PREAMPLIFICATION

[75] Inventors: Melvyn Dixon, Lower Macungie Township, Lehigh County, Pa.; Nils A. Olsson, New Providence, N.J.; Robert E. Tench; Liang Tzeng, both of Upper Macungie Township, Lehigh County, Pa.

[73] Assignee: American Telephone and Telegraph Company, AT&T Bell Laboratories, Murray Hill, N.J.

[21] Appl. No.: 219,684

[22] Filed: Jul. 15, 1988

[51] Int. Cl.⁴ ............................................. G02F 1/01
[52] U.S. Cl. .................................... 250/225; 455/601
[58] Field of Search ............... 455/601, 612, 619, 616, 455/610, 609, 602; 250/551, 225; 330/4.6

[56] References Cited

U.S. PATENT DOCUMENTS

| | | | |
|---|---|---|---|
| 3,722,982 | 3/1973 | Brandt | 455/616 |
| 3,971,930 | 7/1976 | Fitzmaurice | 250/199 |
| 4,506,388 | 3/1985 | Monerie | 455/616 |
| 4,635,246 | 1/1987 | Taylor et al. | 455/619 |
| 4,752,120 | 6/1988 | Shimizu | 455/616 |
| 4,777,358 | 10/1988 | Nelson | 250/225 |
| 4,778,238 | 10/1988 | Hicks | 455/612 |

FOREIGN PATENT DOCUMENTS

| | | | |
|---|---|---|---|
| 0251062 | 1/1988 | European Pat. Off. | 455/619 |
| 3431896 | 3/1986 | Fed. Rep. of Germany | 455/619 |
| 0060127 | 5/1981 | Japan | 455/601 |
| 0200641 | 11/1983 | Japan | 455/601 |

OTHER PUBLICATIONS

Wideband 1.5 um Optical Receiver Using Travelling-Wave Laser Amplifier, M. J. O'Mahony, I. W. Marshall, H. J. Westlake, W. G. Stallard, Electronics Letters, 6 Nov. 1986, vol. 22, No. 23.

Primary Examiner—David C. Nelms
Assistant Examiner—Michael Messinger
Attorney, Agent, or Firm—Wendy W. Koba

[57] ABSTRACT

A polarization insensitive optical device is disclosed which is capable of providing direct optical amplification of an input signal of unknown (and possibly varying) polarization. A polarization diversity technique is utilized wherein a polarization beam splitter is used to divide the incoming signal into orthogonal components of known polarization (TE,TM). The orthogonal components are then separately amplified, using a semiconductor laser as the amplifying device. The amplified components are then recombined, either optically or electrically, to form the final output signal.

14 Claims, 3 Drawing Sheets

POLARIZATION INSENSITIVE OPTICAL COMMUNICATION DEVICE UTILIZING OPTICAL PREAMPLIFICATION

BACKGROUND OF THE INVENTION

1. Field of the Invention

The present invention relates to a polarization insensitive optical communication device utilizing optical preamplification and, more particularly, to such a device which uses polarization diversity to provide improved optical amplification.

2. Description of the Prior Art

In a conventional direct detection optical communication scheme, a message signal originates from a semiconductor light emitting source, travels over a length of optical fiber, and impinges the active region of a semiconductor photodetector. For many applications, this relatively simple system is satisfactory. However, at high bit rates (>4 Gb/s, for example), the coupling efficiency of the system degrades significantly, with a sensitivity of only −26 dBm at 8 Gb/s transmission (with a $10^{-9}$ bit error rate (BER)). Most high bit rate systems require a sensitivity of at least −32 dBm. A solution to this problem is to provide optical amplification at the input of the photodetector. That is, preamplify the optical signal before it enters the photodiode. One method of achieving this preamplification is to transform the optical signal into an electrical form (with a conventional photodiode, for example), perform standard electrical amplification with any of the various methods well-known in the art, then reconvert the amplified electrical signal into an amplified optical signal at the input of the receiver photodiode. In theory, this is a workable solution. In practice, however, the need to perform these optical-electrical and electrical-optical conversions has been found to seriously degrade the quality of the message signal. Further, these systems often require rather sophisticated and expensive electrical components.

A preferable solution is to perform optical amplification directly upon the message signal. As discussed in the article "Wideband 1.5 μm Optical Receiver Using Traveling-Wave Laser Amplifier", by M. J. O'Mahony et al. appearing in Electron Letters, No. 22, 1986 at pp. 1238-9, conventional lasers may be used to perform this optical amplification. Although this is considered an improvement, there still exists a problem with these devices in that they are sensitive to the state of polarization of the incoming light signal. In particular, due to the difference in confinement factors in the laser structure, the TE and TM polarization states may exhibit a difference in gain of approximately 10 dB. Such a polarization dependence is undesirable for optical amplifiers utilized with installed optical fiber-based communication networks, where the polarization state of the message signal is at best unknown, and at worst varies as a function of time.

Thus, a need remains in the prior art for achieving optical amplification which is truly polarization insensitive.

BRIEF DESCRIPTION OF THE DRAWING

Referring now to the drawings, where like numerals represent like parts in several views.

DETAILED DESCRIPTION

Figure 1:
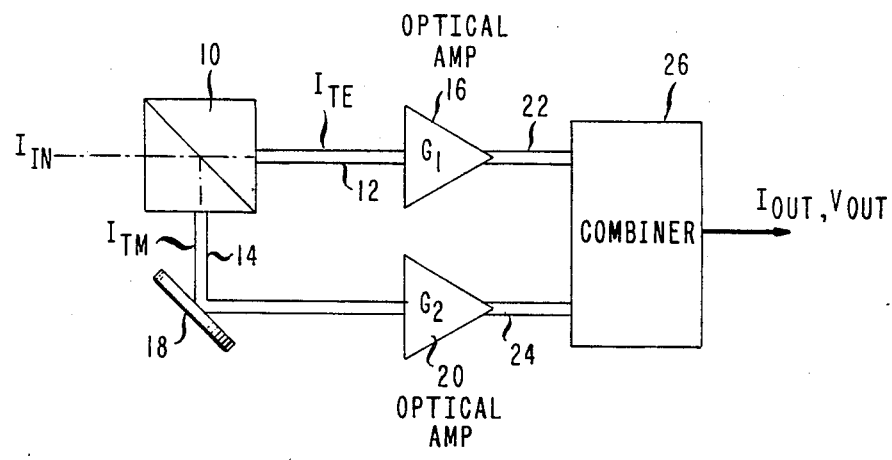
FIG. 1 is a block diagram of an exemplary polarization insensitive arrangement of the present invention.

A simplified block diagram of the proposed polarization insensitive scheme of the present invention is illustrated in FIG. 1. As shown, an incoming optical signal $I_{IN}$ with an unknown polarization state is applied as an input to a polarization beam splitter 10 which functions to split signal $I_{IN}$ into two separate components having known polarizations. In particular, polarization beam splitter 10 functions to form a first component consisting of a TE polarized signal, denoted $I_{TE}$, and a second component consisting of a TM polarized signal, denoted $I_{TM}$. Polarization beam splitter 10 subsequently directs the first component $I_{TE}$ into a first section 12 of a polarization maintaining waveguide (polarization maintaining fiber, for example) and the second component $I_{TM}$ into a second section 14 of polarization maintaining waveguide. Thus, regardless of the state of polarization of signal $I_{IN}$, the component propagating along waveguide section 12 will always be of a first, known state (TE) and similarly, the component propagating along waveguide section 14 will always be of the orthogonal state (TM).

First signal component $I_{TE}$ is subsequently applied as an input to a first optical amplifier 16, optical amplifier 16 being a laser amplifier of the type described in the O'Mahony et al. article mentioned above. It has been observed that the typical semiconductor laser which is utilized as a laser amplifier, a CSBH laser, for example, will exhibit a gain of approximately 25 dB when the incoming signal is polarized in the TE mode, as compared with a lesser gain of approximately 15-22 dB with a TM polarized incoming signal. Therefore, to obtain the maximum gain from first laser amplifier 16, amplifier 16 is oriented such that its TE axis is aligned with signal component $I_{TE}$. As illustrated in FIG. 1, with this alignment, first optical amplifier 16 is defined as exhibiting a gain of $G_1$ such that the output from optical amplifier 16 is $G_1 * I_{TE} = I'_{TE}$.

In a similar fashion, second component $I_{TM}$ is also amplified. Referring to the particular arrangement of FIG. 1, second component $I_{TM}$ is redirected 90° by a mirror element 18 into a second optical amplifier 20. As mentioned above, a laser amplifier will exhibit the most gain when the incoming signal is polarized along the TE axis. Thus, second laser amplifier 20 is oriented such that its TE axis is orthogonal to the direction of propagation of second component $I_{TM}$ and parallel to the electric field vector of second component $I_{TM}$. As illustrated in FIG. 1, second optical amplifier 20 exhibits a gain factor $G_2$ such that the output from second optical amplifier 20 is defined as $G_2 * I_{TM} = I'_{TM}$. As will be discussed in detail hereinafter in association with FIG. 2, it is preferred that the gain $G_1$ of first amplifier 16 be identical to the gain $G_2$ of second amplifier 20. This requirement is relatively easy to accomplish when the amplifiers are simultaneously fabricated on the same substrate. When this is the case, the gains will be relatively identical and will track each other as a function of both temperature and time. Otherwise, the DC drive currents applied to lasers 16 and 20 may be individually adjusted to equalize their gain.

Subsequent to the amplification, first component $I'_{TE}$ is directed along a waveguide 22 into a combiner element 26. Similarly, second component $I'_{TM}$ is directed along a waveguide 24 into combiner element 26. As will be described in detail hereinafter, combiner 26 performs either an electrical recombination of components $I'_{TE}$ and $I'_{TM}$ so as to form an electrical voltage output signal $V_{OUT}$, or an optical recombination of components $I'_{TE}$ and $I'_{TM}$ so as to form an optical output signal $I_{OUT}$. An optical recombination is performed when the arrangement of FIG. 1 is utilized as an in-line optical amplifier (for either direct detection or coherent communication systems), as discussed in association with FIGS. 4 and 5. Alternatively, an electrical recombination is performed when the arrangement of FIG. 1 is utilized as the receiver portion of a direct detection communication system, as discussed in detail below in association with FIGS. 2 and 3.

Figure 2:
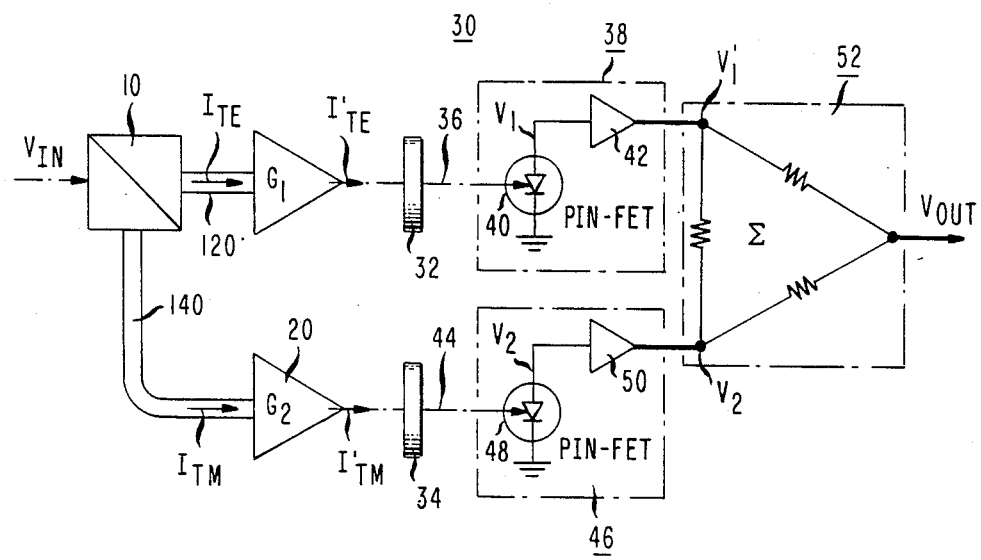
FIG. 2 illustrates a polarization insensitive direct detection receiver utilizing the exemplary arrangement of FIG. 1.
Figure 4:
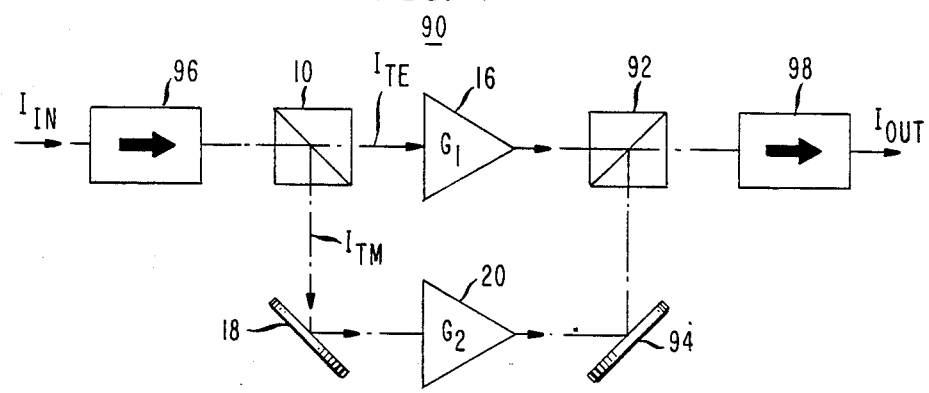
FIG. 4 illustrates an exemplary in-line optical amplifier utilizing the arrangement of FIG. 1.

It is to be noted that for the polarization insensitive arrangement of FIG. 1, the performance of first optical amplifier 16 and second optical amplifier 20 may be degraded by reflections as discussed in the O'Mahony article mentioned above. Such reflections may be caused by imperfect performance of polarization beam splitter 10, polarization maintaining waveguides 12, 14, 22 and 24 or mirror element 18. Such reflections may also be caused by imperfect performance of optical components prior to polarization beam splitter 10, or subsequent to combiner 26 when optical recombination is employed. To optimize the performance of optical amplifiers 16 and 20 in FIG. 1, and in subsequent arrangements of FIG. 2 and FIG. 4, isolators may be employed. Faraday optical isolators are known in the art as exemplary devices capable of performing optical isolation. The isolators may be fabricated using either bulk optics or integrated optics techniques. The need for optical isolators, the number and specific design of isolators to be employed and the location of such isolators with respect to optical amplifiers 16,20 will be apparent to those skilled in the art.

An exemplary direct detection receiver 30 utilizing the arrangement of FIG. 1 is illustrated in FIG. 2. As previously described, the input to receiver 30 is an optical signal $I_{IN}$ comprising an unknown (and usually varying with time) polarization state. This signal is first applied as an input to polarization beam splitter 10 which functions as described above to separate $I_{IN}$ into two components of known, orthogonal polarizations, $I_{TE}$ and $I_{TM}$. First component $I_{TE}$, as shown in FIG. 2, follows along branch 1 and is coupled into a polarization maintaining waveguide, illustrated in this embodiment as a section of polarization maintaining fiber 120, where fiber 120 directs component $I_{TE}$ into first laser amplifier 16. Similarly, signal component $I_{TM}$, following along branch 2, is coupled into a section of polarization maintaining fiber 140 and subsequently applied as an input to second laser amplifier 20. It is to be understood that various lensing arrangements may be used to couple polarization maintaining fibers 120,140 to amplifiers 16,20, and that polarization maintaining waveguides of other forms could be utilized, where in some embodiments a reflecting element, such as mirror 18 of FIG. 1, would be required to redirect one of the signal components into its associated laser amplifier.

Devices currently utilized as laser amplifiers are known to exhibit spontaneous-spontaneous beat noise which seriously degrades the quality of the amplified output signal. To solve this problem, bandpass filters may be placed at the exit of such amplifiers to minimize this noise factor. Thus, referring to FIG. 2, amplified signal $I'_{TE}$ exiting first laser amplifier 16 is subsequently applied as an input to a first optical bandpass filter 32. First filter 32 is chosen to comprise a sufficiently narrow bandwidth such that most of the spontaneous-spontaneous beat noise associated with the performance of laser amplifier 16 is removed from amplified signal $I'_{TE}$. A second optical bandpass filter 34 is positioned at the exit of second laser amplifier 20 so as to perform the same function on amplified signal $I'_{TM}$. It is to be understood that such filtering is not essential to the performance of receiver 30, but merely improves the quality of the final output signal.

Following the filtering operation, the final receiver detection operation is performed. As shown in FIG. 2, filtered signal $I'_{TE}$ travels along a section of polarization maintaining fiber 36 and is applied as an input to a first PIN-FET receiver 38. In particular, filtered signal $I_{TE}'$ is coupled into the active region of a first PIN photodiode 40 which then transforms the optical signal into an equivalent voltage signal, denoted $V_1$. Voltage signal $V_1$ is subsequently applied as an input to a conventional FET amplifying section 42 which is designed to provide a predetermined amount of signal gain. Filtered signal $I'_{TM}$ simultaneously propagates along a section of polarization maintaining fiber 44 and is applied as an input to a second PIN-FET recevier 46. Second receiver 46 comprises a PIN photodiode 48 which is responsive to filtered signal $I'_{TM}$ to form an equivalent voltage representation denoted $V_2$. Voltage signal $V_2$ is then applied as an input to FET amplifier 50, identical in form and function to FET amplifier 42. An exemplary matched amplifying section 42,50 will be described in detail in association with FIG. 3.

First PIN-FET receiver 38 thus produces as an output a first amplified voltage signal $V'_1$, which is representative of the TE polarized portion of the received light signal $I_{IN}$. Likewise, PIN-FET receiver 42 produces as an output a second amplified voltage signal $V'_2$ which is representative of the TM polarized portion of the received light signal $I_{IN}$. In order to form the final voltage output signal $V_{OUT}$, receiver output signals $V'_1$ and $V'_2$ are applied as inputs to an electrical summing network, which may simply be a resistor bridge 52 as illustrated in FIG. 2.

It is to be understood that direct detection receiver 30 may be formed with either discrete components, or integrated to form a monolithic structure. A combination of these techniques may also be applied to form a hybrid arrangement. A discrete component version is relatively simple to envision, utilizing bulk optics to form polarization beam splitter 10 and filters 32,24; discrete semiconductor devices for laser amplifiers 16,20 and photodiodes 40,48; polarization maintaining optical fiber for the optical signal paths; and integrated (or discrete) electronic components for FET amplifiers 42,50 and summing network 52. Alternatively, receiver 30 may be of monolithic form, utilizing an optical substrate with polarization beam splitter 10, the various polarization maintaining waveguides, and filters 32,34 directly formed in the substrate material. Lasers 16,20, as well as PIN-FET receivers 38,42 may then be fabricated on this substrate, where various techniques for forming integrated opto-electronic devices are becoming utilized in the art.

Operation of receiver 30 may be understood by considering baseband signal and noise currents for a given received optical power $\bar{P}$ of input signal $I_{IN}$. Of this received power, a predetermined fraction $kx\bar{P}$ will be coupled into branch 1 associated with the amplification of signal $I_{TE}$, where k is defined as the loss associated with a conventional polarization beam splitter and has been determined experimentally to be approximately equal to 0.71. The variable x is associated with the variation in the polarization of signal $I_{IN}$ ($0 < x < 1$, i.e., fully TE polarized through mixed polarizations to fully TM polarized). The optical power coupled into branch 2 associated with the amplification of signal $I_{TM}$ will thus be $k(1-x)\bar{P}$. The baseband signal current associated with $I_{IN}$ may then be written as:

$$i_{signal} = \frac{e}{hv} k\bar{P}[x\eta_1(\eta_1^{in}\eta_1^{out}G_1) + (1-x)\eta_2(\eta_2^{in}\eta_2^{out}G_2)] \quad (1)$$

where the subscripts 1 and 2 refer to branches 1 and 2, hv is the photon energy, e the electronic charge, $\eta$ is the photodiode quantum efficiency, G is defined as the laser amplifier gain, and $\eta^{in}$, $\eta^{out}$ are the laser amplifier input and output coupling efficiencies, respectively.

As stated above, the photodetectors employed in the first detection receiver of the present invention are preferably matched devices. That is, the photodetectors exhibit like characteristics in terms of gain, efficiency, etc. Thus, the photodiode quantum efficiency of the detectors will be essentially identical and equation (1) may be simplified by defining $\eta_1 = \eta_2 \eta$. Therefore, equation (1) may be rewritten in the following form:

$$i_{signal} = \frac{e}{hv} k\bar{P}\eta[x(\eta_1^{in}\eta_1^{out}G_1) + (1-x)(\eta_2^{in}\eta_2^{out}G_2)] \quad (2)$$

Similarly, the coupling arrangement (i.e., lenses) between fibers 120,140 and amplifiers 16,20 may be designed such that $\eta_1^{in} = \eta_2^{in} = \eta^{in}$. The equation representing the baseband current may then be simplified to the form:

$$i_{signal} = \frac{e}{hv} k\bar{P}\eta\eta^{in}[x(\eta_1^{out}G_1) + (1-x)(\eta_2^{out}G_2)]. \quad (3)$$

Therefore, if receiver 30 is formed so that $\eta_1^{out}G_1 = \eta_2^{out}G_2 = \eta^{out}G$, $i_{signal}$ will be independent of polarization, as shown below:

$$\begin{aligned}
i_{signal} &= \frac{e}{hv} k\bar{P}\eta\eta^{in}\eta^{out}G[x + 1 - x] \\
&= \frac{e}{hv} k\bar{P}\eta\eta^{in}\eta^{out}G.
\end{aligned} \quad (4)$$

As stated above, it is possible to provide $G_1 = G_2$ by careful fabrication of the laser amplifiers. Any variation between the two subsequent to manufacture may be compensated for by adjusting the DC drive currents to the laser amplifiers.

Figure 3:
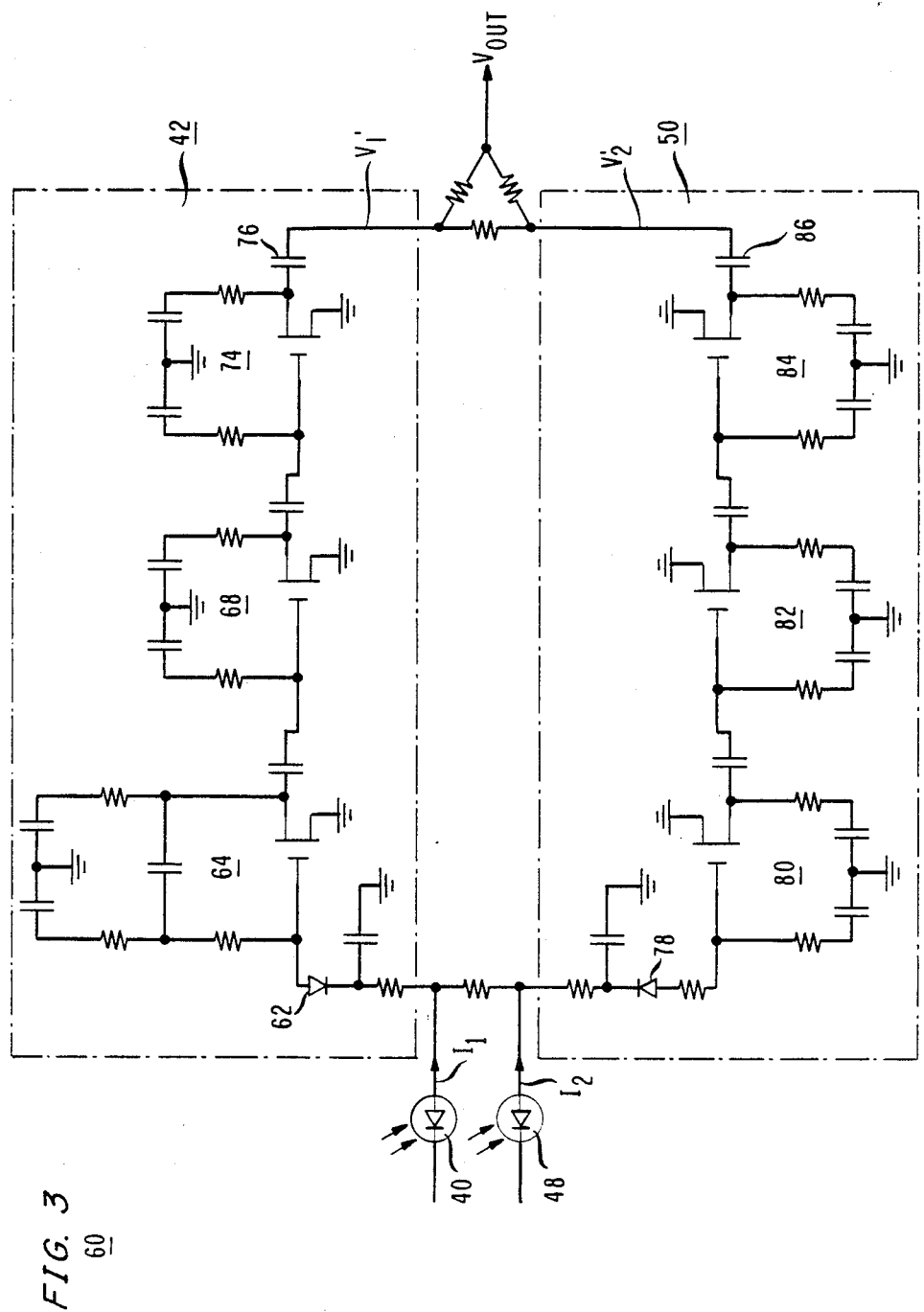
FIG. 3 illustrates an exemplary receiver configuration for use in the direct detection scheme of FIG. 2.

An exemplary balanced receiver circuit 60 for converting the polarized light signals into the final receiver output $V_{OUT}$ is illustrated in FIG. 3. This particular arrangement is a three-stage FET amplifier which provides an overall transimpedance of approximately 1KΩ. Referring to FIG. 3, first current signal $I_1$ provided by PIN 40 is first filtered by a simple RC network and passed through a blocking diode 62. Current signal $I_1$ is then applied as an input to a first amplifying stage 64, where stage 64 includes an FET 66 and associated resistive and capacitive elements. The specific values for these elements are chosen to provide the desired amount of voltage gain for first stage 64. The output from first stage 64 is then applied as an input to a second amplifying stage 68, where a capacitor 70 is utilized to provide the AC coupling between first stage 64 and second stage 68. As with first stage 64, second stage 68 comprises an FET amplifying element, with various resistive and capacitive elements included to provide the predetermined amount of gain. The output of second stage 68 is then capacitively coupled via element 72 to a third amplifying stage 74. Third stage 74 also includes an FET amplifying element and the necessary resistive and capacitive elements. The output from third stage 76 is defined as the amplified voltage signal $V'_1$ and is AC coupled by a capacitor 76 to an input of resistor bridging network 52, as described above in association with FIG. 2.

Second current signal $I_2$, provided by PIN photodiode 48 in response to light signal $I'_{TM}$, follows a similar path through receiver 60. In particular, second current signal $I_2$ is first filtered and pressed through a second blocking diode 78. The signal then passes through a series of three amplifying stages 80, 82 and 84, each identical in form and function to those associated with signal $I_1$ as described above. The output from the last amplifying stage 84 is thus the amplified voltage signal $V'_2$ which is coupled by a capacitor 86 to another input of resistor bridging network 52. As described above, bridging network 52 functions to electrically sum the signals $V'_1$ and $V'_2$ to form the output signal $V_{OUT}$.

As mentioned above, the polarization insensitive optical amplification technique of the present invention may also be utilized to form an in-line optical amplifier. A block diagram of one such exemplary in-line optical amplifier 90 is illustrated in FIG. 4. As discussed above, the input to such an amplifier 90 is an optical signal $I_{IN}$ comprising an unknown (and usually varying with time) polarization state. Input signal $I_{IN}$ is applied as an input to polarization beam splitter 10 which then breaks signal $I_{IN}$ into a pair of orthogonal components of known TE and TM polarization, the components being thus defined as $I_{TE}$ and $I_{TM}$, respectively. As discussed in detail in association with FIG. 1, first component $I_{TE}$ is subsequently applied as an input to first laser amplifier 16, where maximum coupling efficiency is achieved by aligning the TE axis of laser amplifier 16 with the electric field vector of signal $I_{TE}$. Similarly, second component $I_{TM}$ is applied as an input to second amplifier 20 which is aligned such that its TE axis is orthogonal to the direction of propagation of second component $I_{TM}$ and parallel to the electric field vector of second component $I_{TM}$ so as to provide maximum gain.

The output signals from first and second laser amplifiers 16 and 20, $I'_{TE}$ and $I'_{TM}$ respectively, are subsequently recombined by a second polarization beam splitter 92 which is disposed to receive the separate signals $I'_{TE}$, $I'_{TM}$ and recombine them to form the optical output signal $I_{OUT}$. In the particular arrangement illustrated in FIG. 4, second polarization beam splitter 92 is shown as being aligned with first optical amplifier 16 so that amplified signal $I'_{TE}$ may follow a direct path to the input of splitter 92. Therefore, amplified signal $I'_{TM}$ from second optical amplifier 20 must be redirected by a second reflecting surface 94 towards the remaining input of splitter 92. It is to be understood that polarization beam splitter 92 may also be positioned in the path of second amplifier 20, with signal I'$_{TE}$ being redirected towards an input to splitter 92.

A pair of optical isolators 96 and 98 may be included with in-line amplifier 90 to prevent any reflected signal components (from various couplings, for example) from entering laser amplifiers 16 and 20, where these reflected signals would add destructively to the message signal, degrading the quality of output signal I$_{OUT}$. As stated above, Faraday optical isolators are known in the art as an exemplary device capable of performing optical isolation.

Figure 5:
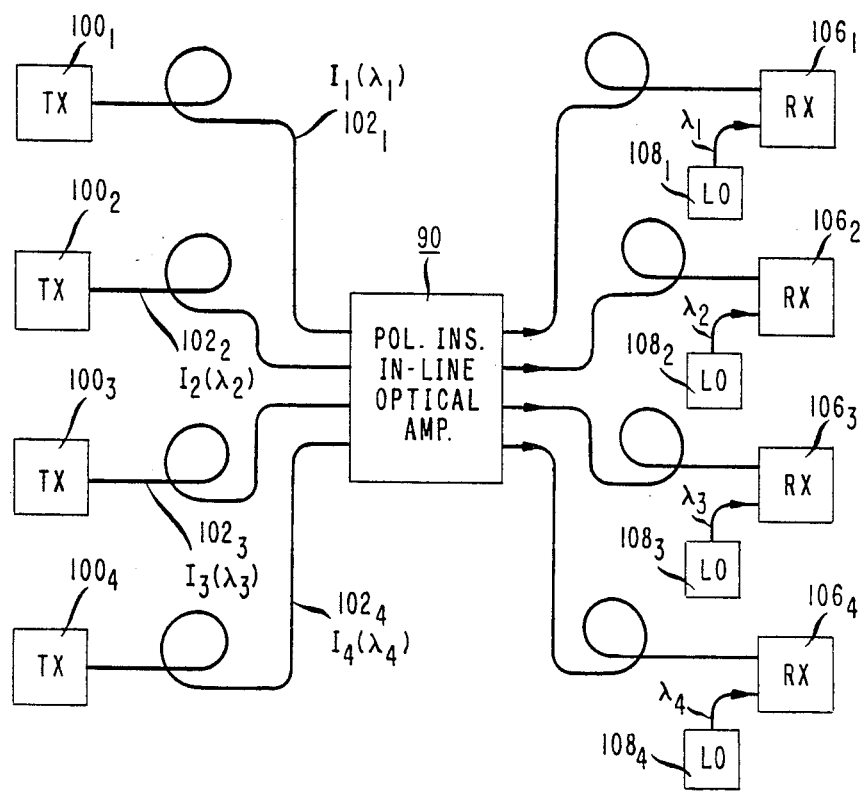
FIG. 5 illustrates a wavelength division multiplexer (WDM) coherent communication scheme utilizing the in-line optical amplifier of FIG. 4.

As discussed above, an advantage of an in-line optical amplifier is that it may be used with a wavelength division multiplexed (VDM) coherent (or direct) detection communications network so as to provide amplification of each signal being transmitted, regardless of its operating wavelength. In contrast, WDM systems which utilize electrical amplification require separate amplifying units for each wavelength. Thus, a system utilizing the polarization insensitive in-line optical amplifier of the present invention will realize an approximate N-fold saving in amplifying components for an N signal system. A simplified block diagram illustrating one such WDM system is illustrated in FIG. 5. As shown, the WDM system comprises a plurality of N transmitting units, denoted $100_1$-$100_N$, where each transmitter produces a separate message signal utilizing an assigned wavelength $\lambda_1$-$\lambda_N$. These signals then propagate over a plurality of N optical fibers $102_1$-$102_N$ and are coupled to the input of polarization insensitive in-line optical amplifier 90, configured as illustrated in FIG. 4. The output from amplifier 90 will thus contain amplified version of any signal being transmitted at wavelengths $\lambda_1$-$\lambda_N$. This output subsequently propagates along a plurality of optical fibers $104_1$-$104_N$ which are coupled, respectively, to the inputs of a plurality of coherent receivers $106_1$-$106_N$. Associated with each receiver $106_1$-$106_N$ is a local oscillator $108_1$-$108_N$, each local oscillator tuned to the specific wavelength of its receiver so as to achieve coherent detection of the correct message signal.

We claim:

1. A polarization insensitive optical communication device for providing optical amplification of an input optical signal comprising an unknown polarization state, said device comprising
   a polarization beam splitter responsive to the input optical signal for directing a first component of said input signal, of a first defined polarization state, along a first signal path and directing a second, orthogonal component of a second defined polarization state, along a second signal path;
   a first semiconductor laser optical amplifier disposed in the first signal path and responsive to the first component for generating as an output an amplified version thereof, the first optical amplifier aligned with respect to the first polarization state of said first component so as to provide maximum amplification;
   a second semiconductor laser optical amplifier disposed in the second signal path and responsive to the second component for generating as an output an amplified version thereof, the second optical amplifier aligned with respect to the second polarization state of said second component so as to provide maximum amplification; and
   means responsive to the amplified output signals generated by the first and second semiconductor laser optical amplifiers for combining the amplified first and second orthogonal components to provide as the output of said communication device an amplified version of the optical input signal.

2. A polarization insensitive optical communication device as defined in claim 1 wherein the device further comprises
   a first optical isolator disposed in the signal path in front of the polarization beam splitter; and
   a second optical isolator disposed in the signal path after the combining means, said first and second optical isolators for preventing reflected optical signals from entering the first and second semiconductor laser optical amplifiers.

3. A polarization insensitive optical communication device as defined in claim 1 wherein the first component of the optical input signal is of the TE polarization state and the second component is of the TM polarization state.

4. A polarization insensitive optical communication device as defined in claim 1 wherein the first and second optical amplifiers comprise laser amplifiers which exhibit a maximum gain when the TE axis of said laser amplifiers is parallel to the electric field vector and orthogonal to the direction of propagation of the optical signal being amplified.

5. A polarization insensitive optical communication device as defined in claim 4 wherein
   the first component of the optical input signal is of the TE polarization state and the TE axis of the first laser amplifier is aligned in the direction of polarization of said first component; and
   the second component of said optical input signal is of the TM polarization state and the TE axis of the second laser amplified is aligned in the direction of polarization of said second component.

6. A polarization insensitive optical communication device as defined in claim 1 wherein the combining means comprises an optical combining means for providing an optical combination of the first and second orthogonal components to provide as an output an amplified optical signal.

7. A polarization insensitive optical communication device as defined in claim 6 wherein the optical combining means comprises
   a polarization beam combiner responsive to both the first and second amplified components generated by the first and second optical amplifiers, respectively, said polarization beam combiner for recombining said amplified components and providing as an output the amplified optical signal.

8. A polarization insensitive optical communication device as defined in claim 7 wherein the device further comprises
   a first optical isolator disposed in the signal path in front of the polarization beam splitter; and
   a second optical isolator disposed in the signal path after the polarization beam combiner, said first and second optical isolators for preventing reflected optical signals from entering the first and second optical amplifiers.

9. A polarization insensitive optical communication device as defined in claim 1 wherein the combining means comprises optical-electrical conversion means and electrical combining means for providing an optical-electrical conversion and electrical combination of the first and second orthogonal components to provide as an output an amplified voltage signal.

10. A polarization insensitive optical communication device as defined in claim 9 wherein the electrical combining means comprises a first photodetector responsive to the first amplified optical component for converting said first amplified optical component to an electrical representation thereof;

a first electrical receiver responsive to the electrical representation provided by said first photodetector for producing a first voltage output signal having a predetermined gain;

a second photodetector responsive to the second amplified optical component for converting said second amplified optical component to an electrical representation thereof;

a second electrical receiver responsive to the electrical representation provided by said second photodetector for producing as an output a second voltage signal having a predetermined gain; and electrical summing means responsive to said first and second voltage signals for adding said signals and providing as an output the amplified voltage signal.

11. A polarization insensitive optical communication device as defined in claim 10 wherein the electrical combining means further comprises a first optical filter disposed between the first optical amplifier and the first photodetector for removing unwanted noise components from the first amplified optical component; and a second optical filter disposed between the second optical amplifier and the second photodetector for removing unwanted noise components form the second amplified optical component.

12. A polarization insensitive optical communication device as defined in claims 10 or 11 wherein the first and second photodetectors comprise PIN photodetectors.

13. A polarization insensitive optical communication device as defined in claims 10 or 11 wherein the first and second electrical receivers comprise FET receivers.

14. A polarization insensitive optical communication device as defined in claims 10 or 11 wherein the summing means comprises a resistor bridging network.

* * * * *